Patented Nov. 3, 1953

2,658,028

UNITED STATES PATENT OFFICE 2,658,028

MANUFACTURE AND USE OF ALUMINA-PLATINUM CATALYSTS

Vladimir Haensel, Hinsdale, and Louis Schmerling, Riverside, Ill., assignors to Universal Oil Products Company, Chicago, Ill., a corporation of Delaware No Drawing. Application December 14, 1951, Serial No. 261,748

9 Claims. (Cl. 196—50)

This application is a continuation-in-part of copending and now abandoned application Serial No. 101,904, filed June 28, 1949, and relates to the manufacture and use of catalysts and more particularly to the manufacture and use of catalysts containing platinum.

The manufacture and use of platinum-containing catalysts have heretofore been suggested, but these catalysts have been of limited commercial acceptance because of the high cost thereof. More recently, it has been discovered that exceptionally good catalysts may be prepared to contain low amounts of platinum provided that certain specific methods of preparation are utilized and provided that particular supporting and activating components, the latter in specific proportions, also be employed. The present invention is directed to a novel method of manufacturing these catalysts and to the use thereof.

In one embodiment the present invention relates to a method of manufacturing a catalyst which comprises reacting alumina or hydrated alumina with a carboxylic acid capable of forming a basic aluminum acid salt therewith at a temperature of from about 150° to about 300° C., and converting the resultant basic aluminum acid salt to form a purified alumina, compositing platinum with said purified alumina, and subsequently heating the composite.

In a specific embodiment the present invention relates to a method of preparing a catalyst which comprises reacting gamma aluminum oxide or hydrated gamma aluminum oxide with acetic acid containing at least 60% of said acid at a temperature of from about 150° to about 300° C., hydrolyzing the resulting basic aluminum acetate salt to form an aqueous alumina sol, combining a halogen with the alumina in an amount of from about 0.1% to about 8% by weight of the alumina on a dry basis, commingling a platinum-containing solution with the halogen-containing alumina in an amount to form a final catalyst containing from about 0.01% to about 1% by weight of platinum, and heating the composite at a temperature of from about 400° to about 650° C.

As hereinbefore set forth, the catalyst contains from about 0.01% to about 1% by weight of platinum and the preferred catalyst also contains from about 0.1% to about 8% by weight of a halogen. When the halogen comprises fluorine, it is present in an amount of from about 0.1% to about 3% by weight and when the halogen comprises chlorine, it is present in an amount of from about 0.2% to about 8% by weight. In some cases, the halogen may comprise a mixture of chlorine and fluorine, the total thereof being within the range of from about 0.1% to about 8% by weight.

Due to the use of so small amounts of platinum and, in the preferred embodiment, of halogen, the presence of an impurity in even a small amount tends to affect the catalyst detrimentally. It is readily seen that with a catalyst containing 0.1% by weight of platinum, the presence of an impurity in even so low an amount would tend to mask the effect of the platinum. Similarly when the halogen is used, the impurity would likewise tend to mask the effect of the halogen. In view of the fact that the alumina comprises over 90% of the catalyst composition and therefore is the essential source for impurity to enter the catalyst, a particularly advantageous method of manufacturing the catalyst is from a substantially pure alumina. The present invention, therefore, is directed to a combination of mutually related and interdependent steps of preparing purified alumina and compositing the alumina with the other components in the manner herein set forth.

In order that the impurities be kept to a minimum, care must also be exercised to be certain that impurities are not introduced into the catalyst from the halogen, platinum compound, water or other washing mediums used during the manufacture of the catalyst. Particular care should be exercised in making sure that the water is properly treated or distilled so that it will be sufficiently free from undesirable impurities.

As hereinbefore set forth, one of the essential features of the present invention is the manufacture of substantially pure alumina by the reaction of gamma alumina or hydrated gamma alumina with a carboxylic acid. The alumina for use as the charging material in the present process must not contain substantial proportions of the refractory or condensed form of alumina designated in the literature as alpha alumina which characterizes the structure of fused alumina appearing in such materials as rubies, sapphires, corundum, etc. The latter are apparently inert to the acidic reagent utilized in the present method of treatment and are not to be considered within the intended scope of the term gamma alumina or hydrated gamma alumina. The term gamma alumina as used in this specification and in the claims includes both the anhydrous form of gamma alumina and its hydrated forms (e. g., $Al_2O_3 \cdot 3H_2O$, gibbsite; and $Al_2O_3 \cdot H_2O$, boehmite).

The purified alumina for use in the preparation of catalysts in accordance with the present invention is prepared in accordance with the following sequence of steps. Alumina containing gamma aluminum oxide, such as impure alumina ore, exemplified by the least expensive natural source of alumina, the trihydrate, is mixed with an organic acid of at least 60% by weight concentration (preferably a lower molecular weight member of the fatty acid series such as formic and acetic acids) in a quantity corresponding to an excess over the theoretical molar ratio required for converting said alumina to the monobasic acid salt thereof. The mixture of acid and alumina starting material is thereafter heated at a temperature in excess of about 150° C. up to about 300° C., preferably within the range of from about 180° to about 250° C., while maintaining the pressure sufficiently superatmospheric to maintain at least a portion of the acidic reactant in liquid phase. The reaction period required to convert the alumina to the aluminum salt of the acid varies with the particular acid selected and may require from about 0.5 to about 20 hours.

The reaction for the formation of basic aluminum acid salt is represented, for example, in the following equation in which acetic acid represents the organic acid reactant:

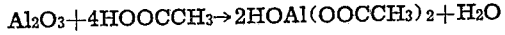
$$Al_2O_3 + 4HOOCCH_3 \rightarrow 2HOAl(OOCCH_3)_2 + H_2O$$

The corresponding reaction using an aluminum oxide trihydrate is represented in the following equation:

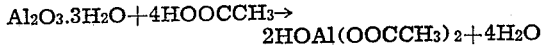
$$Al_2O_3 \cdot 3H_2O + 4HOOCCH_3 \rightarrow 2HOAl(OOCCH_3)_2 + 4H_2O$$

Suitable organic acids utilizable in the present reaction to form the basic aluminum acid salt include acetic acid and formic acid which, for reasons hereinafter specified, are the preferred treating agents, trichloroacetic acid, dichloroacetic acid, monochloroacetic acid, oxalic acid, malonic acid, succinic acid, tartaric acid and others. Acids having ionization constants less than $1 \times 10^{-3}$ are preferred. Formic acid and acetic acid, containing at least 60% by weight of the acid in the reagent, are preferred, not only because of their relatively low cost, but further because of their effectiveness in yielding the desired basic aluminum acid compound thereof in substantially quantitative yields. Treating agents containing less than about 60° by weight of the organic acid do not effect the desired conversion either at a practical rate or to a practical extent, the rate of conversion and the proportion of alumina converted to the acid salt increasing as the concentration of the reagent approaches the anhydrous acid. In the use of anhydrous formic and acetic acids, conversion to the corresponding basic aluminum acid salts is practically quantitative when the reaction conditions are maintained as above specified. At least four molecular proportions of acid to alumina must necessarily be charged into the reaction mixture to provide for the production of the monobasic acid salt and preferably this ratio of organic acid to alumina is above the theoretical requirement, from about 6 to 1 to about 12 to 1 in order to obtain maximum conversion at a reasonable rate. If the ratio is about 4 to 1 or slightly higher, the product may be used directly, without intermediate filtration, for conversion to a sol as described hereinafter.

The treatment of the charged alumina to form the basic aluminum acid salt comprising the intermediate product of the present process is effected at a temperature above about 150° C., preferably from about 180° to about 250° C. while maintaining the acid reagent in substantially liquid phase by utilizing superatmospheric pressure. At temperatures lower than about 150° C. the conversion of the alumina is sluggish and incomplete, the product, even after long reaction periods, containing an appreciable quantity of unconverted alumina charging material.

The basic aluminum acid salt, the product of treating alumina with the organic acid reagent, and usually insoluble in the excess acid, may be separated from said excess acid by filtration or merely admixed with water and subsequently converted to an aqueous dispersion of alumina sol in accordance with an alternative method of handling the reactants in the present process. The treatment of the reaction mixture containing excess acid and basic aluminum acid salt for removal of the acid therein may be effected by filtering off the salt and washing it with a suitable solvent for the acid, such as water, until a major proportion of the acid has been dissolved away from the product. An alternative procedure comprises distilling the excess acid from the reaction mixture, preferably at a sub-atmospheric pressure, to vaporize the organic acid at a relatively lower temperature than at atmospheric pressure. It is generally sufficient in the case of most acids to merely add water to the reaction mixture and filter or reserve the entire mixture for subsequent hydrolytic treatment of the basic aluminum acid salt therein for conversion to an aqueous dispersion of alumina sol.

In the formation of the alumina sol by the present method of hydrolyzing the intermediate basic aluminum acid salt, the salt is merely heated in the presence of water in which it is practically insoluble, at temperatures above the boiling point of the mixture, of from about 100° to about 300° C. (and, therefore, at superatmospheric pressures to maintain the water substantially in liquid phase) until hydrolysis is complete, usually indicated by the formation of a clear or translucent solution comprising an aqueous dispersion of the alumina sol. The quantity of water required is generally a matter of convenience, although the amount must be sufficient to adequately disperse the sol. For this purpose an amount at least equal and preferably greater than the volume of salt hydrolyzed is utilized in the hydrolytic reaction. The reaction mechanism for the conversion of a typical basic aluminum acid salt, such as basic aluminum acetate, to alumina is indicated in the following equation:

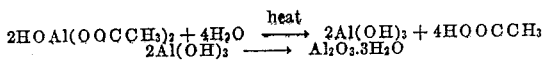
$$2HOAl(OOCCH_3)_2 + 4H_2O \xrightarrow{heat} 2Al(OH)_3 + 4HOOCCH_3$$
$$2Al(OH)_3 \longrightarrow Al_2O_3 \cdot 3H_2O$$

The alumina sol prepared in the above manner may be utilized as the source of purified alumina for the preparation of the catalyst in accordance with the present invention or it may be converted into a hydrogel and the hydrogel used as the source of alumina. The transformation of alumina sol to the corresponding gel may be effected, in accordance with one method of treatment, by introducing into the aqueous dispersion of the alumina sol comprising the reaction mixture of the prior hydrolytic reaction, a water soluble ionizable substance, such as an electrolyte, preferably added to the sol dispersion as an aqueous solution of said ionizable substance. The transformation of the sol to gel is generally completed within a short time interval from the instant the ionizable substance is added to the aqueous dispersion of alumina sol and after a short period of induction, generally not exceeding about 20 seconds. The interval of time during which the sol-gel transformation takes place enables the aqueous admixture of sol and electrolyte to be comminuted into droplets during the time lag and thereby provide for the production of substantially spherical semi-rigid particles of the alumina hydrogel following the transformation. The hydrogel is characteristically a semisolid, gelatinous mass upon precipitation from an aqueous dispersion of the sol and assumes roughly the shape of the container in which the sol to gel transformation takes place. If alumina spheres are desirable as the ultimate product, the aqueous mixture of the sol and ionizable substance or gel precipitant may be dispersed into droplets immediately after the sol and precipitant are mixed and if then suspended in an immiscible fluid medium as the transformation of the mixture to alumina gel takes place, the droplet assumes the shape of a spherical, semi-rigid globule which may be subsequently dehydrated to form a substantially spherical, porous rigid particle of alumina. The latter particle is impregnated with catalytic promoting substances as herein provided to form a catalyst having certain advantages therein associated with its spherical shape.

Suitable ionizable, water-soluble substances which effect the conversion of the alumina sol to a gel and thus act as gel precipitants include the mineral acids, organic acids having an ionization constant above about $1 \times 10^{-3}$, bases, and water-soluble ionizable salts. Mineral acids such as hydrochloric, sulfuric, phosphoric, etc., are effective gel precipitants, but are not generally preferred in the present process because of the peptizing action of such acids on the alumina gel, making the recovery of the gel relatively difficult because of the passage of the finely divided peptized alumina gel particles through the usual filtering means when the precipitated alumina gel is recovered by filtering the aqueous suspension formed from the sol dispersion. Carboxylic acid having an ionization constant above about $1 \times 10^{-3}$ may also be utilized to coagulate the alumina sol to the gel. Among the preferred carboxylic acids for this purpose are: mono- and dichloroacetic acid, oxalic acid, malonic acid, etc. Other organic acids such as picric acid and the sulfonic acids such as benzene-sulfonic acid also cause gelation of the alumina sol. The preferred gelling agents comprise the bases, and particularly ammonium hydroxide, which may be subsequently volatilized from the gel without depositing a foreign residue on the finally recovered alumina product. Other utilizable bases include various amines having a basic reaction in aqueous solution, and preferably the readily volatilized amines such as dimethyl amine and diethyl amine. Ionizable, water-soluble salts may also be employed as precipitants of the alumina gel from the aqueous sol and include, among others, the ammonium salts such as ammonium chloride, ammonium bromide, ammonium sulfate, ammonium formate, ammonium acetate, etc., which have the advantage over other salts that the salt residue remaining in the body of the alumina gel upon drying the coagulated, filtered alumina precipitate may be vaporized therefrom during subsequent calcination. The preferred salts comprise those which volatilize when the dried alumina gel is subsequently dried or calcined at temperatures above about 100° C., up to about 800° C. and consequently the above mentioned ammonium salts are considered the preferred precipitants of the alumina gel. It is to be emphasized, however, that apparently any water-soluble ionizable salt may be utilized as gelling agent herein and that it may be substantially completely removed from the gel by washing with sufficient water. The salt is preferably added to the aqueous dispersion of the alumina sol as a saturated aqueous solution thereof and generally only small amounts are required to cause the gelation. That the gelatinous precipitate obtained from the hydrolyzed basic aluminum acid salt actually comprises alumina hydrogel and not merely precipitated basic aluminum acid salt is established by the fact that the precipitation is initiated by the mere addition of a relatively small number of ions into the sol dispersion and the amount of ionizable substance required is much less than the stoichiometric ratio required to cause chemical conversion of the basic aluminum acid salt to aluminum hydroxide and alumina gel.

When it is desired to form the alumina gel in a single operation, starting with the basic aluminum acid salt, the latter may be hydrolyzed and the resulting alumina sol converted to the corresponding gel in a one-stage procedure. The method comprises hydrolyzing the salt in an aqueous solution of an electrolyte or other ionizable substance, the ions of which effect the sol to gel transformation in the aqueous medium. One of the preferred reagents for this purpose is an ammonium compound, such as ammonium hydroxide, added to the mixture of water and basic aluminum acid salt subjected to hydrolysis in accordance with the procedure and at the temperature and pressure conditions hereinabove provided. The product is an aqueous suspension of alumina gel or a mixture of the gel and water. The product is filtered, washed and/or dried to recover the alumina in a manner similar to the procedure described above.

Following the precipitation of the gel, the resulting, somewhat gelatinous mass may be filtered to recover the alumina gel from the excess water or composited while in aqueous suspension or after filtration with the other components to form the catalytic particles for utilization in the catalytic conversion reaction. The product obtained by means of the present methods of production has a low density and a high surface to mass ratio.

Another method of recovering an activated form of alumina consists in evaporating to dryness the alumina sol, prepared, for example, by the hydrolysis of basic aluminum acetate.

Flocculent material having a large superficial area and absorptive capacity may also be recovered from the basic aluminum acid intermediate product by thermal dissociation thereof, effected by calcining or thermally decomposing said salt. Basic aluminum acetate, for example, when calcined at temperatures of from about 400° to about 600° C., and especially in the presence of an oxygen-containing atmosphere, yields a white fluffy alumina product having a highly porous structure which makes it especially attractive for use as a catalyst support. The calcination yields acetone, acetic acid and carbon dioxide as by-products in accordance with the following proposed reaction mechanism:

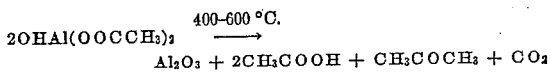
$$2\text{OHAl}(\text{OOCCH}_3)_2 \xrightarrow{400-600\ °C} \text{Al}_2\text{O}_3 + 2\text{CH}_3\text{COOH} + \text{CH}_3\text{COCH}_3 + \text{CO}_2$$

In accordance with still another alternative method of recovering a highly porous alumina product from a basic aluminum acid salt, the latter salt, such as basic aluminum acetate, may be contacted with an alcohol, such as an aliphatic alcohol, at a temperature sufficient to effect alcoholysis of the acid radical in the basic aluminum acid salt. Utilizing basic aluminum acetate, for example, as the starting material, the salt is heated to a temperature of from about 150° to about 250° C. and is contacted at this temperature with vapors of a suitable alcohol passed over the acetate until substantially complete conversion of the salt to alumina has taken place. The alumina product is a dry, fluffy solid residue, and the by-product alcohol acetate may be recovered from the effluent vapors of the reaction. The preferred alcohols comprise the low molecular weight members of the aliphatic series, such as methanol, ethanol, propanol, etc. although the reaction is not necessarily limited by the molecular weight of the alcohol reactant.

Alumina shows unexpected advantages for use as a supporting component for the low platinum concentrations, apparently due to some peculiar association of the alumina with the platinum either as a chemical combination or as a physical association. Similarly, it has been found that the halogen enters into an association with the alumina and/or platinum, either as a chemical combination or physical association, and thereby serves to further improve the final catalyst. The specific combination of alumina and low platinum concentrations, particularly with the halogen, produces a very active catalyst and one that has a long catalyst life; that is, the catalyst retains its high activity for long periods of service. After these long periods of service, the catalyst may show a drop in activity and can be regenerated in the manner to be hereinafter set forth.

For the purposes of the present specification and claims, the use of the term "platinum" is intended to include both the combined platinum and the free platinum. As hereinbefore set forth it is believed that the platinum is present in a combined state. However, in some state during preparation or use of the catalyst, the platinum may be present as free platinum. The use of the term "halogen" is intended to mean the combined halogen as it is believed that the halogen is combined with the alumina and/or platinum. It is not believed that any free halogen as such is present in the catalyst because the free halogen would be liberated during the steps in the manufacture of the catalyst.

The purified alumina, prepared in the manner hereinbefore set forth, may be composited with the platinum and/or halogen in any suitable manner. It is understood that the alumina may be utilized in any of the forms as hereinbefore set forth, such as the sol, hydrogel, flocculent material, etc. It is also understood that when an acid is to be added as said ionizable substance, this may comprise the halogen constituting one of the components of the catalyst composition.

When desired, the alumina may be given a washing treatment, either with pure water or water containing ammonium hydroxide, to further reduce the impurities therein. In one embodiment of the invention, the halogen may be composited with the alumina and then the platinum added thereto. In another embodiment of the invention the platinum may be first composited with the alumina and the halogen then added. However, in either of these embodiments, the materials must be composited in a particular manner in order to insure optimum distribution of the components throughout the alumina, as will hereinafter be set forth. Similarly, in either of these embodiments, the alumina may be formed into particles of uniform or irregular size and shape either before one or more of the other components are added thereto, or this material may be formed into the desired particles after all of the components have been composited with the catalyst.

When the other components are to be added to the alumina in a wet condition, this may be readily accomplished by adding the halogen and/or platinum to the sol or preferably to the hydrogel in a slurry in water. In one embodiment of the invention the halogen is added first to the alumina. The halogen may be added in any suitable manner but should be added in a form which will readily react with the alumina in order to obtain the desired results and also must not leave undesired deposits in the catalyst. A preferred method of adding the halogen is in the form of an acid, such as hydrogen fluoride, hydrogen chloride, hydrogen bromide and/or hydrogen iodide. Hydrogen fluoride is preferably added as an aqueous solution for ease in handling and for control of the specific amount to be used. Another satisfactory source to be used for adding the halogen is the volatile salts, such as ammonium fluoride, ammonium chloride, etc. The ammonium ions will be removed during the subsequent heating of the catalyst and, therefore, will not leave undesirable deposits in the catalyst. In still another method, the halogen may be added as fluorine, chlorine, bromine or iodine but, in view of the fact that fluorine and chlorine normally exist as a gas, it is generally preferable to utilize them in the form of a solution for ease in handling. As hereinbefore set forth, the concentration of halogen will be within the range of from about 0.1% to about 8% by weight of the alumina on a dry basis.

In the embodiment being here described, the platinum is added to the wet alumina with or without halogen. Any suitable source of platinum may be used. Preferably the platinum is added in the form of a solution such as a chloroplatinic acid solution. Chloroplatinic acid is the generally preferred source of platinum because it is more readily available. Solutions of other platinum-containing compounds may be employed including those of ammonium platinum chloride, trimethylbenzyl ammonium platinum chloride, barium platino cyanide, tetramino platino chloride, ammonium platino nitrate, dinitro diamino platinum, etc. It is understood that, when the platinum compounds contain constituents undesired in the final catalyst, the composite will be treated to remove the undesired constituents. It is also understood that, when desired, other than aqueous solutions may be employed and this is particularly useful in cases where the platinum compound is not readily water soluble.

When the platinum is to be added to the alumina in the wet condition, the platinum is preferably added in the form of a colloidal suspension of a platinum sulfide in water. This method results in uniform distribution of the platinum throughout the alumina. In this method, hydrogen sulfide is added to an aqueous solution of chloroplatinic acid. The addition of hydrogen sulfide is continued until the solution reaches a constant coloration; that is, will not change color upon the addition of more hydrogen sulfide. The chloroplatinic acid solution is normally light yellow and upon addition of hydrogen sulfide gas, turns to a dark brown color. Apparently the chloroplatinic acid and hydrogen sulfide react to form one or more complex chemical compounds. The brown solution of chloroplatinic acid and hydrogen sulfide may then be commingled with the slurry of wet alumina. The slurry is stirred sufficiently to obtain intimate mixing of the two solutions.

In another embodiment of the invention the halogen may be added to the alumina in a wet condition and the composite of alumina and halogen may be dried and formed into particles of uniform or irregular size and shape. In still another embodiment the alumina may be utilized in the form of previously dried and formed material as hereinbefore set forth. The platinum may be added in any suitable manner, including the use of the solutions of platinum-containing compounds as hereinbefore set forth.

Either before or after compositing the alumina with the halogen and platinum, the material is formed into particles of uniform or irregular size and shape. In one method the wet material is dried at a temperature of from about 100° to about 300° C. for a period of from about 2 to 24 hours or more, the dried material is ground into particles of irregular size and shape, and then is calcined at a temperature of from about 400° to about 650° C. for a period of from about 2 to 12 hours or more. In another embodiment the dried material may be composited with a suitable lubricant such as stearic acid, rosin, hydrogenated coconut oil, graphite, etc. and then formed into pills of uniform size and shape in any suitable method such as by pelleting, extrusion, etc. The pills are then calcined at a temperature of from about 400° to about 650° C. for a period of from about 2 to 12 hours or more. When the alumina or alumina-halogen is calcined prior to the addition of the platinum, the calcination temperature may be slightly higher and may be within the range of from about 400° to about 800° C. However, after the platinum has been incorporated, the composite should not be calcined at a temperature above about 650° C. In one embodiment of the invention the catalyst may be reduced in the presence of hydrogen at a temperature of below about 650° C. for a period of 2 to 12 hours or more and then calcined in the presence of air at a similar temperature, although the reverse procedure may be utilized when desired.

Although the catalyst of the present invention will have a long life, it may be necessary to regenerate the catalyst after long periods of service. The regeneration may be effected by treatment with air or oxygen-containing gas to burn the carbonaceous deposits therefrom. In general it is preferred to control the regeneration temperature not to exceed about 650° C., and preferably the regeneration is effected at a temperature within the range of from about 300° to about 400° C.

The improved catalysts of the present invention may be employed in any process for which platinum is a catalyst. The improved catalysts are particularly satisfactory for reforming operations in which a saturated gasoline, such as straight run gasoline, natural gasoline, etc. is subjected to conversion to produce a reformed gasoline of improved antiknock properties. The saturated gasoline generally comprises a mixture of naphthenic and paraffinic hydrocarbons, and the reforming operation effects dehydrogenation of the naphthenic hydrocarbons to aromatics, cyclization of the paraffinic hydrocarbons to aromatics, as well as to effect a controlled type of cracking which is selective both in quality and in quantity. In addition, other reactions may occur such as isomerization, hydrogen transfer, etc. The controlled or selective cracking is desirable because it further increases the octane number of the reformed gasoline, produces a gasoline of higher volatility and also converts the higher boiling fractions to lower boiling fractions within the range of gasoline. However, this cracking must be controlled because excessive cracking produces excessive normally gaseous products and also excessive carbonaceous deposits on and deactivation of the catalyst. The improved catalysts of the present invention are particularly desirable for reforming operations because the catalyst effects the desired aromatization and controlled cracking under the selected conditions of operation.

The catalyst of the present invention may also find utility in the treatment of higher boiling saturated fractions such as kerosene, gas oil, etc. In many cases it is desirable to produce from kerosene a highly aromatic product useful as a solvent, and the present invention is readily applicable for this purpose. The gasoline, kerosene, etc. fractions comprise a mixture of different hydrocarbons and, in accordance with the invention, the full boiling range fraction or any selected fraction thereof may be subjected to the desired conversion. When a selected fraction is so treated, it may be blended, all or in part, with the other fraction.

The catalyst of the present invention may prove particularly useful for destructive hydrogenation or hydrocracking reactions in which hydrocarbons and particularly oil heavier than gasoline is subjected to conversion to produce lower boiling products and particularly gasoline. For cracking reactions, it is preferred that the halogen content of the catalyst be within the upper limits of the ranges hereinbefore set forth because these higher halogen catalysts are more active for effecting decomposition reactions.

The catalysts of the present invention may also be useful for effecting hydrogenation reactions including the hydrogenation of unsaturated aliphatic hydrocarbons, such as mono-olefins, diolefins, etc., to form the corresponding saturated hydrocarbons, hydrogenation of unsaturated cyclic hydrocarbons, hydrogenation of unsaturated alcohols, ketones, acids, etc. Other reactions in which these catalysts may find utility include oxidation as, for example, oxidation of olefins to form the corresponding oxide, such as the oxidation of ethylene to ethylene oxide, propylene to propylene oxide, etc., oxidation of alcohols, ketones, etc. These and other oxidation reactions are well known in the art, and it is within the scope of the present invention to effect these reactions in the presence of the novel catalysts. In reactions involving hydrogenation, oxidation or condensation, it is preferred that the halogen content of the catalyst be within the lower limits of the ranges hereinbefore specified in order to minimize side reactions.

As hereinbefore set forth, selected processing conditions are required depending upon the particular reaction desired. For reforming of straight run gasoline the temperature employed should be within the range of from about 300° to about 550° C., the pressure within the range of from about 50 to about 1000 pounds per square inch, and the weight hourly space velocity within the range of from about 0.5 to about 10. For dehydrogenation of normal butane the temperature should be within the range of from about 400° to about 550° C., the pressure from about atmospheric to about 50 pounds per square inch, and the gaseous hourly space velocity from about 200 to about 5000. For hydrogenation reactions the temperature may range from atmospheric to about 300° C., the pressure from about 100 to about 3000 pounds or more, and the weight hourly space velocity from about 0.5 to 5. The weight hourly space velocity is defined as the weight of oil per hour per weight of catalyst in the reaction zone.

In one embodiment of the process, sufficient hydrogen will be produced in the reforming reaction to furnish the hydrogen required in the process and, therefore, it may be unnecessary to either introduce hydrogen from an extraneous source or to recycle hydrogen within the process. However, it usually will be preferred to introduce hydrogen from an extraneous source, generally at the beginning of the operation, and to recycle hydrogen within the process in order to be assured of a sufficient hydrogen atmosphere in the reaction zone. In some cases the gas to be recycled will contain hydrogen sulfide, introduced with the charge or liberated from the catalyst, and it is within the scope of the present invention to treat the hydrogen-containing gas to remove hydrogen sulfide or other impurities before recycling the hydrogen within the process.

The process of the present invention may be effected in any suitable equipment. A particularly suitable process comprises the well known fixed bed system in which the catalyst is disposed in a reaction zone and the hydrocarbons to be treated are passed therethrough in either upward or downward flow. The products are fractionated to separate hydrogen and to recover the desired products. As hereinbefore set forth, the hydrogen may be recycled for further use in the process. Other suitable units in which the process may be effected include the fluidized type process in which the hydrocarbons and catalysts are maintained in a state of turbulence under hindered settling conditions in a reaction zone, the compact moving bed type in which the catalyst and hydrocarbons are passed either concurrently or countercurrently to each other, and the suspensoid type of operation in which the catalyst is carried into a reaction zone as a slurry in the hydrocarbon oil.

The following examples are introduced to illustrate further the novelty and utility of the present invention but not with the intention of unduly limiting the same.

*Example I*

200 parts of alumina trihydrate (the material commercially known as "Alorco") was heated with 500 parts by weight of glacial acetic acid at a temperature of 180° C., and a pressure of 50 atmospheres of nitrogen in a rotating autoclave for 6 hours. The contents of the autoclave were thereafter cooled and filtered. The products consisted of 390 parts by weight of basic aluminum acetate.

170 parts by weight of the basic aluminum acetate formed in the manner hereinbefore set forth was added to 1120 parts by weight of water and heated at a temperature of 180° C. in a rotating autoclave for 4 hours. The product was a uniform, translucent sol. The product as recovered from the autoclave represented substantially complete hydrolysis of the acetate salt charged. The aqueous sol was a grayish white by reflected light and almost water white by transmitted light.

Ammonium hydroxide was added to the translucent sol to precipitate alumina gel. The resulting gel was washed 5 times with water and then slurried in sufficient water to make a thick slurry. Hydrogen fluoride solution was added to the slurry in an amount to form a final catalyst containing 0.75% by weight of fluorine. A colloidal suspension of chloroplatinic acid and hydrogen sulfide was then added to the slurry in an amount to form a final catalyst containing 0.3% by weight of platinum. The product was dried and then calcined for 3 hours at 500° C.

The catalyst as prepared in the above manner was utilized for the reforming of a Pennsylvania naphtha having an A. S. T. M. motor method octane number of 41.8 and a research method octane number of 39.2. The reforming was effected at a temperature of 450° C., a pressure of 500 pounds per square inch, a space velocity of 2 and a hydrogen to hydrocarbon ratio of 2.8 to 1. 86.6% by volume of a reformate having an A. S. T. M. motor method octane number of 74.6 and a research method octane number of 82.2 was obtained.

*Example II*

190 parts by weight of basic aluminum acetate formed in a manner similar to that described in Example I was added to 1300 parts by weight of water and heated to 180° C. for 4 hours. The translucent sol thus prepared was evaporated to dryness in a convection oven at 110° C., yielding a solid which was ground to pass through 30 mesh size (apparent bulk density of 0.62).

To the alumina prepared in the above manner, hydrogen fluoride was added in an amount to form a final catalyst containing 0.75% fluorine and chloroplatinic acid was added in an amount to form a final catalyst containing 0.3% by weight of platinum, after which the material was dried at a temperature of 150° C. for 16 hours and then calcined at a temperature of 500° C. for 6 hours.

The catalyst as prepared in the above manner when used for the reforming of a Mid-Continent naphtha having an A. S. T. M. motor method octane number of 34.6 and a research method octane number of 34.8, the reforming being effected at a temperature of 455° C., a pressure of 500 pounds per square inch, a space velocity of 2 and a hydrogen to hydrocarbon ratio of 3 to 1, produced approximately 94% by volume of a reformate having an A. S. T. M. motor method octane number of 70.6 and a research method octane number of 77.2. The amount of carbon produced in a 3 day operation amounted to 1.2% by weight of the catalyst.

In contrast thereto, a catalyst was prepared from the same gamma alumina but was not subjected to reaction with acetic acid and subsequent hydrolysis. The same amount of hydrogen fluoride and chloroplatinic acid were added to the alumina and the catalyst was finished in the same manner.

When used for the reforming of the same Mid-Continent naphtha this catalyst gave only 91.7% by volume of a reformate having an A. S. T. M. motor method octane number of 66.8 and a research method octane number of 70.2. Further, the amount of carbon formed in a one day operation amounted to 2.1% by weight of the catalyst.

It will be noted that the catalyst made from the original alumina gave a lower yield of lower octane number product and almost twice as much carbon as contrasted with the catalyst which has been purified by treatment with acetic acid and then hydrolyzed.

*Example III*

The fact that substantially anhydrous acetic acid is the preferred reagent in the conversion of alumina to the basic aluminum acetate is shown in the following results wherein 20 parts by weight of anhydrous alumina was heated with 100 parts by weight of 50% acetic acid at a temperature of 180° C. in a rotating autoclave charged with nitrogen at an initial pressure of 50 atmospheres. After 7 hours of the above conditions, the alumina was recovered chiefly unchanged from the reaction mixture. Under similar conditions utilizing 75% acetic acid, 80% of the alumina was converted to the desired basic aluminum acetate.

*Example IV*

In another preparation, formic acid was utilized in place of glacial acetic acid. 10.5 parts by weight of alumina trihydrate (the commercial product "Alorco") was heated with 120 parts by weight of 90% formic acid at a temperature of 180° for 5 hours in a rotating autoclave charged to an initial nitrogen pressure of 50 atmospheres. The yield of product (16.5 parts by weight) represents an almost quantitative conversion of the alumina to basic aluminum formate.

*Example V*

Alumina (15 parts by weight as alumina trihydrate) reacted readily with dichloroacetic acid (102 parts by weight of 100% acid) at 160° C. for 6 hours in an autoclave at atmospheric pressure. The reaction product was a solid salt which, however, went into solution when mixed with water. The solubility of the product in water is believed to be the result of hydrolysis of the dichloroacetic acid yielding hydrochloric acid in aqueous solution which is of sufficient concentration to dissolve the alumina.

We claim as our invention:

1. A method of manufacturing a catalyst which comprises reacting gamma alumina with a carboxylic acid of at least 60% concentration by weight and capable of forming a basic aluminum acid salt therewith at a temperature of from about 150° to about 300° C., converting the resulting basic aluminum acid salt to alumina, combining platinum therewith in an amount to form a final catalyst containing from about 0.01% to about 1% by weight of platinum, and subsequently heating the composite at a temperature of from about 400° to about 650° C.

2. A method of manufacturing a catalyst which comprises reacting gamma alumina with a carboxylic acid of at least 60% concentration by weight and capable of forming a basic aluminum acid salt therewith at a temperature of from about 150° to about 300° C., converting the resulting basic aluminum acid salt to alumina, combining a halogen therewith in an amount of from about 0.1% to about 8% by weight on a dry basis, combining platinum therewith in an amount to form a final catalyst containing from about 0.01% to about 1% by weight, and finally heating the composite at a temperature of from about 400° to about 650° C.

3. A process for manufacturing a catalyst which comprises reacting gamma alumina with a carboxylic acid capable of forming a basic aluminum acid of at least 60% concentration by weight and salt therewith at a temperature of from about 150° to about 300° C., hydrolyzing the resulting basic aluminum acid salt to form a purified alumina sol, combining a halogen with the alumina in an amount of from about 0.1% to about 8% by weight of said alumina on a dry basis, commingling with the halogen-containing alumina a platinum-containing solution in an amount to form a final catalyst containing from about 0.01% to about 1% by weight of platinum, and heating the composite at a temperature of from about 400° to about 650° C.

4. The process of claim 3 further characterized in that said halogen comprises fluorine in an amount of from about 0.1% to about 3% by weight of said catalyst.

5. A process for the manufacture of a catalyst which comprises reacting gamma alumina with acetic acid of at least 60% concentration by weight at a temperature of from about 150° to about 300° C., hydrolyzing the resulting basic aluminum acid salt to form a purified alumina sol, commingling aqueous hydrogen fluoride with said sol and combining fluorine with the latter in an amount of from about 0.1% to about 3% by weight of the alumina on a dry basis, commingling a platinum-containing solution in an amount to form a final catalyst containing from about 0.01% to about 1% by weight of platinum, and heating the composite at a temperature of from about 400° to about 650° C.

6. A method of manufacturing a catalyst which comprises reacting gamma alumina with acetic acid of at least 60% concentration by weight at a temperature of from about 150° to about 300° C., hydrolyzing the resulting basic aluminum acid salt to form a purified alumina sol, adding an ionizable substance to precipitate alumina gel, commingling aqueous hydrogen fluoride with the alumina and combining fluorine with the latter in an amount of from about 0.1% to about 3% by weight of the alumina on a dry basis, commingling a platinum containing solution in an amount to form a final catalyst containing from about 0.1% to about 1% by weight of platinum, and heating the composite at a temperature of from about 400° to about 650° C.

7. A process for reforming gasoline which comprises subjecting said gasoline to contact at reforming conditions with a catalyst prepared by reacting gamma alumina with a carboxylic acid of at least 60% concentration by weight and capable of forming a basic aluminum acid salt therewith at a temperature of from about 150° to about 300° C., converting the resulting basic aluminum acid salt to alumina, combining platinum therewith in an amount to form a final catalyst containing from about 0.01% to about 1% by weight of platinum, and subsequently heating the composite.

8. A process for reforming gasoline which comprises subjecting said gasoline to contact at reforming conditions with a catalyst prepared by reacting gamma alumina with acetic acid of at least 60% concentration by weight at a temperature of from about 150° to about 300° C., hydrolyzing the resulting basic aluminum acid salt to form a purified alumina sol, commingling aqueous hydrogen fluoride with said sol and combining fluorine with the latter in an amount of from about 0.1% to about 3% by weight of the alumina on a dry basis, thereafter commingling a platinum-containing solution in an amount to form a final catalyst containing from about 0.01% to about 1% by weight of platinum, and heating the composite at a temperature of from about 400° to about 650° C.

9. The process for reforming gasoline which comprises subjecting said gasoline to contact at reforming conditions with a catalyst prepared by reacting gamma alumina with acetic acid of at least 60% concentration by weight at a temperature of from about 150° to about 300° C., hydrolyzing the resulting basic aluminum acid salt to form a purified alumina sol, adding an ionizable substance to precipitate alumina gel, commingling aqueous hydrogen fluoride with the alumina and combining fluorine with the latter in an amount of from about 0.1% to about 3% by weight of the alumina on a dry basis, thereafter commingling a platinum-containing solution in an amount to form a final catalyst containing from about 0.1% to about 1% by weight of platinum, heating the composite at a temperature of from about 400° to about 650° C.

VLADIMIR HAENSEL.
LOUIS SCHMERLING.

References Cited in the file of this patent
UNITED STATES PATENTS

| Number | Name | Date |
|---|---|---|
| 2,479,109 | Haensel | Aug. 16, 1949 |